United States Patent
Hong

Patent Number: 6,118,093
Date of Patent: Sep. 12, 2000

[54] METHOD AND APPARATUS FOR CONTROLLING A WELDING ROBOT

[75] Inventor: Sung Jin Hong, Suwon, Rep. of Korea

[73] Assignee: Samsung Electronics Co., Ltd., Suwon, Rep. of Korea

[21] Appl. No.: 09/208,580

[22] Filed: Dec. 10, 1998

[30] Foreign Application Priority Data

Dec. 26, 1997 [KR] Rep. of Korea ................... 97-74521

[51] Int. Cl.[7] ................................................ B23K 9/12
[52] U.S. Cl. ................ 219/61; 215/124.34; 215/125.11; 901/42
[58] Field of Search .................. 219/124.34, 125.1, 219/125.11, 130.01, 130.21, 61; 901/42

[56] References Cited

U.S. PATENT DOCUMENTS

| | | | |
|---|---|---|---|
| 3,555,239 | 1/1971 | Kerth | 219/124.34 |
| 4,144,992 | 3/1979 | Omae et al. | 219/125.11 |
| 4,163,886 | 8/1979 | Omae et al. | 219/125.11 |
| 4,233,491 | 11/1980 | Maruyama et al. | 219/125.1 |
| 4,283,617 | 8/1981 | Merrick et al. | 219/125.1 |
| 4,507,543 | 3/1985 | Ukai et al. | 219/137 PS |
| 4,532,404 | 7/1985 | Boillot et al. | 219/124.34 |
| 4,578,562 | 3/1986 | Lindstrom et al. | 219/125.1 |
| 4,645,902 | 2/1987 | Hayakawa | 219/125.11 |
| 5,136,139 | 8/1992 | Gilliland | 219/130.21 |
| 5,171,954 | 12/1992 | Rinaldi | 219/125.11 |

*Primary Examiner*—Clifford C. Shaw
*Attorney, Agent, or Firm*—Burns, Doane, Swecker & Mathis, L.L.P.

[57] ABSTRACT

An apparatus and a method for controlling a welding robot is disclosed. In the method, an initial welding is performed under initial welding conditions while moving a welding object and a welding torch relatively to each other along a predetermined welding line. Then, a change point at which at least one of the welding conditions should be changed, and a change value of the welding condition, are determined. The welding conditions are changed to the change value at the change point while the welding operation and the relative movement of the welding object and the welding torch are continued. Thus, the welding operation is not stopped during the real-time change of the welding conditions such as welding voltage, welding current, welding speed and the like. Thus, working efficiency and the welding quality are improved, and the discontinuity of the welding bead does not occur.

5 Claims, 6 Drawing Sheets

METHOD AND APPARATUS FOR CONTROLLING A WELDING ROBOT

BACKGROUND OF THE INVENTION

1. Field of the Invention

The present invention relates to a method and an apparatus for controlling a welding robot having an object supporter for supporting a welding object to be welded, and at least one welding torch capable of moving relatively to the welding object. More particularly, the present invention relates to a method and an apparatus for controlling a welding robot, which is capable of performing a real-time change of welding conditions while a plurality of welding conditions are applied in a single welding line.

2. Description of the Prior Art

A welding robot, particularly an arc welding robot, moves welding torches toward an object to be welded (hereinbelow, referred to 'welding object') fixed on a welding jig, and then welds the welding object while moving the welding object and/or the welding torch.

A control part is provided so that the welding operation is performed under predetermined welding conditions.

The control part determines the welding conditions applied to a welding portion on the basis of input parameters such as the type of the welding object, geometric data of the welding portion, the depth of penetration, a starting point of welding and a termination point of welding. The welding conditions include a welding current, a welding voltage, a distance between the welding torch and the welding object, a speed for supplying a wire, a relative velocity of the welding torch and the welding object.

In the conventional welding robot, predetermined welding conditions are applied without any alteration while a single welding line is welded. Generally, in a linear welding line, the welding environment such as the geometric contour of the welding portion, the depth of penetration and the temperature of the welding object, does not vary throughout the entire welding line. Therefore, the alteration of the welding conditions is scarcely needed during the welding operation for the linear welding line.

However, a case may inevitably occur that the welding conditions such as the welding current, the welding voltage, and the welding speed should be changed. For example, when a welding object rotating by a welding jig is welded along a circular path, the temperature of the welding object gradually rises because of a thermal conduction. In such a situation, if the welding operation is continued according to initial welding conditions, i. e., the welding conditions determined on the basis of the low temperature of the welding object, the welding object may be melt excessively, which may cause a defect of welding. Further, even in the linear welding line, the depth of penetration should be changed if the variations of the geometric contour of the welding portions or any other variations occur.

FIG. 8 is a schematic view for illustrating an example that the welding conditions are changed in the conventional welding robot. A welding torch 51 performs welding while moving along a welding line 53 extended from a welding starting point P0 to a welding termination point P2. The welding line 53 consists of a first welding segment 53a which should be welded under the first welding conditions, and a second welding segment 53b which should be welded under the second welding conditions. In the conventional welding robot, the first welding segment 53a is welded under the corresponding initial welding conditions, and the supply of electrical power is stopped in order to temporarily stop the welding operation when the welding torch 51 arrives at a condition change point P1 which lies between the first welding segment 53a and the second welding segment 53b. Then, the welding conditions are changed to the second welding conditions corresponding to the second welding segment 53b, and thereafter the welding operation is resumed in order to weld the second welding segment 53b.

Therefore, much time is consumed in stopping the welding operation and resetting the welding conditions, whereby welding efficiency is lowered. Further, at the condition change point P1, i. e., at the boundary between the first welding segment 53a and the second welding segment 53b, there occurs a discontinuity of welding, which may cause an abrupt alteration of the welding bead. In order to remove such a discontinuity, an after-treatment such as grinding or the like has to be performed by an operator, which is a troublesome task.

SUMMARY OF THE INVENTION

The present invention has been proposed to overcome the above-described problems of the conventional art. Therefore it is an object of the present invention to provide a method and an apparatus for controlling a welding robot, in which, while a single welding line is welded, a real-time change of welding conditions such as a welding voltage, a welding current, a welding speed, and the like, is performed without any stoppage of welding operation, and thereby welding efficiency and the quality of welding are improved.

To achieve the above object, the present invention provides a method for controlling a welding robot having an object supporter for supporting a welding object to be welded and a welding torch capable of moving relatively to the welding object, the method comprising the steps of: welding the welding object under predetermined initial welding conditions while moving the welding object and the welding torch relatively to each other along a predetermined welding line; determining a change point on the welding line, the changing point at which at least one of the welding conditions should be changed, and a change value of the welding conditions; and changing the welding conditions with the change value at the changing point, while a welding operation, and a relative movement of the welding object are continued.

Here, the welding conditions include at least one selected from a group consisting of a welding voltage, a welding current and a velocity of the relative movement.

Preferably, the method for controlling a welding robot according to the present invention further comprises the step of detecting a temperature of a part to be welded of the welding object. When the temperature is higher than a predetermined value, a predetermined amount of at least one of the welding voltage and the welding current is lowered. Furthermore, as the temperature increases, so does the velocity of the relative movement increase.

The method for controlling a welding robot according to the present invention is particularly suitable for a welding object having a shape of a cylinder being rotatably supported with respect to a central axis of the object supporter. In such a situation, the welding line is a circular line formed around the central axis. Preferably, a rotational velocity of the welding object increases/decreases linearly in at least partial rotational section of the welding object according to a rotational angle of the welding object. Furthermore, the rotational velocity of the welding object is maintained constant in a predetermined initial rotational section, and in a predetermined final rotational section.

Moreover, according to the present invention, an apparatus for controlling a welding robot is provided, which is especially suitable for performing the above-described method.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
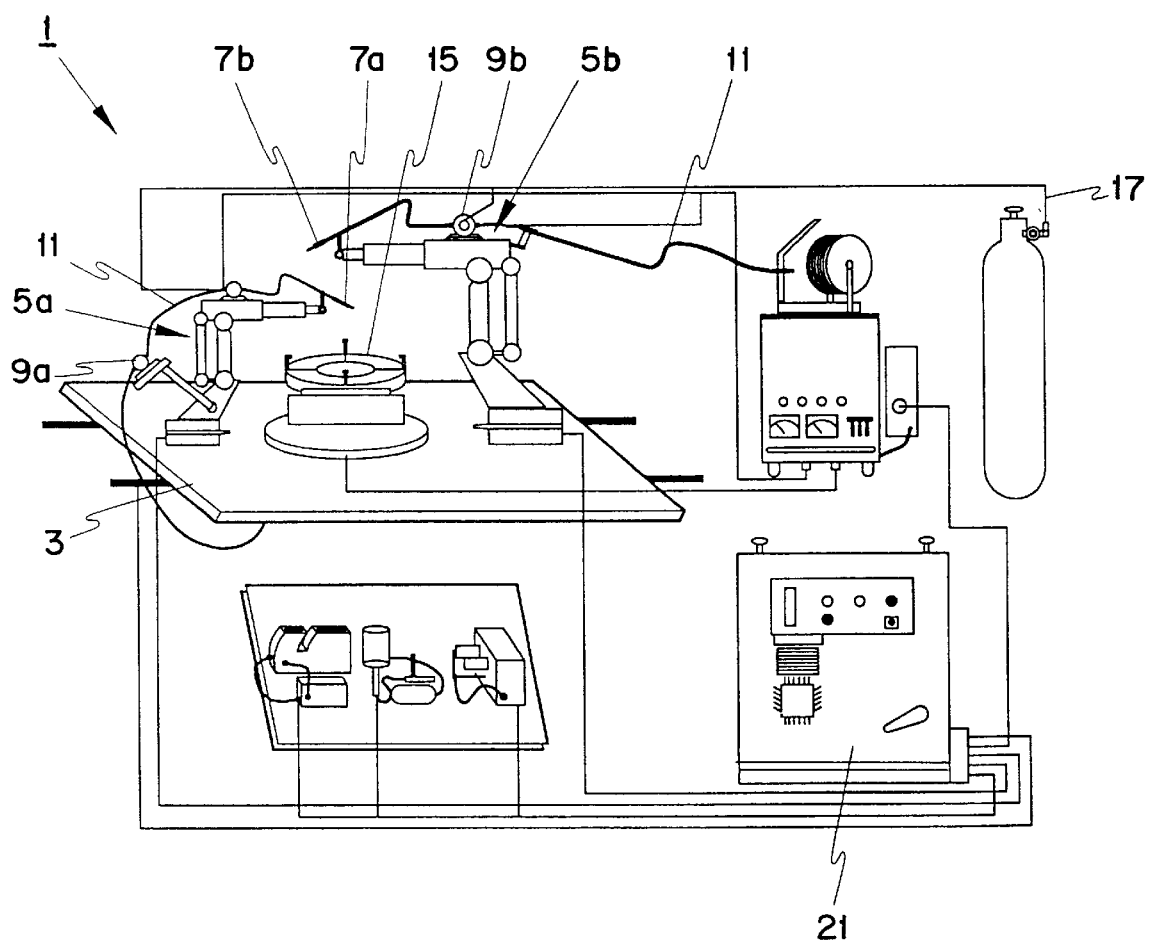
FIG. 1 is a schematic view of a welding robot system.
Figure 2:
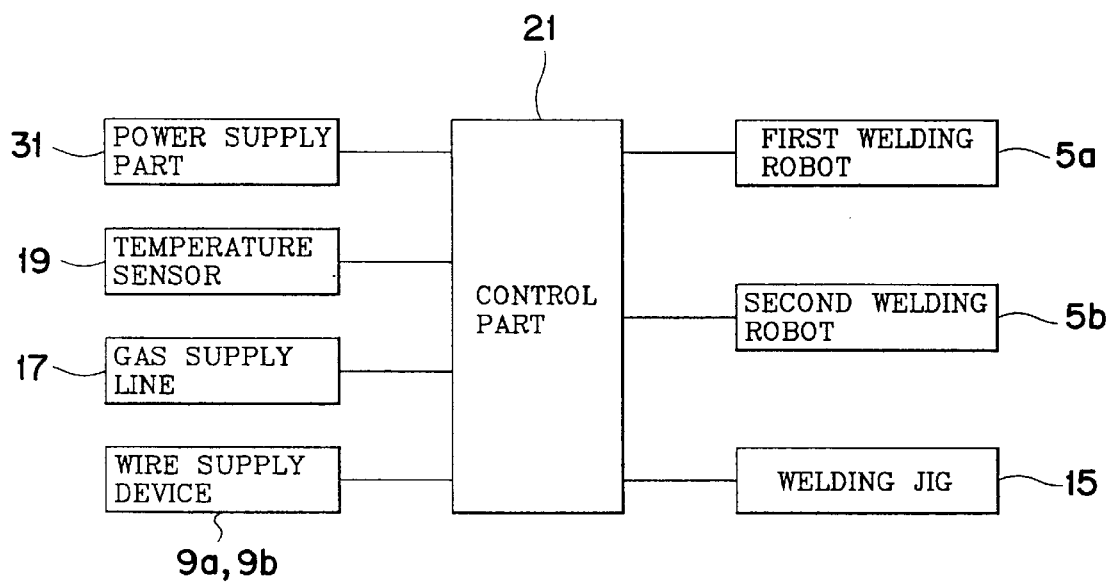
FIG. 2 is a block diagram of a welding robot according to the present invention.

FIG. 1 is a schematic view of a welding robot system 1, and FIG. 2 is a block diagram of a welding robot system 1 shown in FIG. 1.

As shown in the figures, the welding robot system 1 includes first and second welding robots 5a and 5b installed on a base part 3 and facing to each other, and a welding jig 15 for fixing a welding object, which is installed between the welding robots 5a and 5b. Each of the welding robots 5a and 5b consists of six-shaft vertical joint robot having six driving motors. Further, welding torches 7a and 7b are installed on each head part of the welding robots 5a and 5b, which is capable of moving arbitrarily in free space. The welding torches 7a and 7b are supplied with wires 11 from wire supply devices 9a and 9b, and receives gas through a gas supply line 17 to carry out an arc welding. The welding jig 15 supports the welding object to fix it or to move it linearly or rotationally in accordance with a predetermined control process.

A control part 21 controls the welding robots 5a and 5b, the welding jig 15, the gas supply line 17, the wire supply devices 9a and 9b, and a power supply part 31 according to a predetermined program. The control part 21 controls respective function parts according to the welding conditions which have been stored beforehand or according to the welding conditions determined on the basis of a variety of parameters such as the type of the welding object, the geometric data of the welding portion, the depth of penetration, the starting point of welding, the termination point of welding, and the like, so that a desired welding operation can be performed.

Further, the control part 21 is connected with a temperature sensor 19. The temperature sensor 19 senses the temperature of the welding object and inform the control part 21 of data about the sensed temperature. The control part 21 controls the function parts by adjusting the welding conditions on the basis of a signal from the temperature sensor 19, so that the welding operation can be performed under the welding conditions suitable for the temperature of the welding object. Further, the control part 21 receives data about the welding line detected through a laser sensor (not shown) so that the welding operation can be performed precisely.

Figure 3:
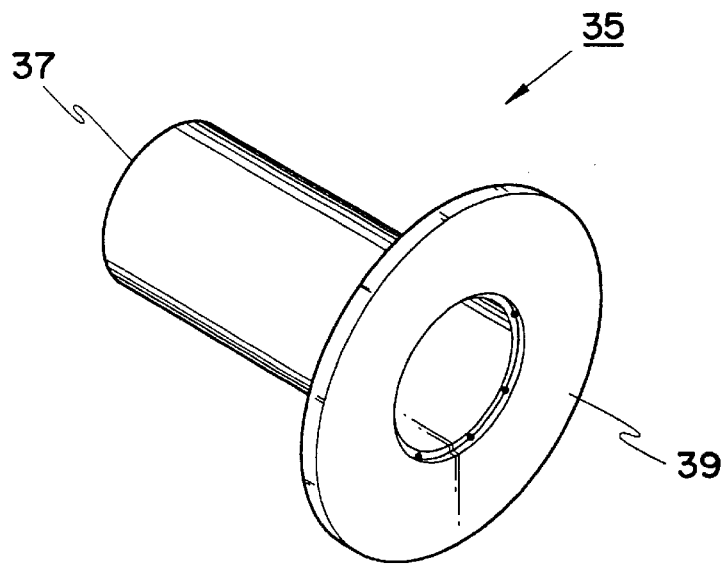
FIG. 3 is a perspective view showing an example of a welding object.
Figure 4:
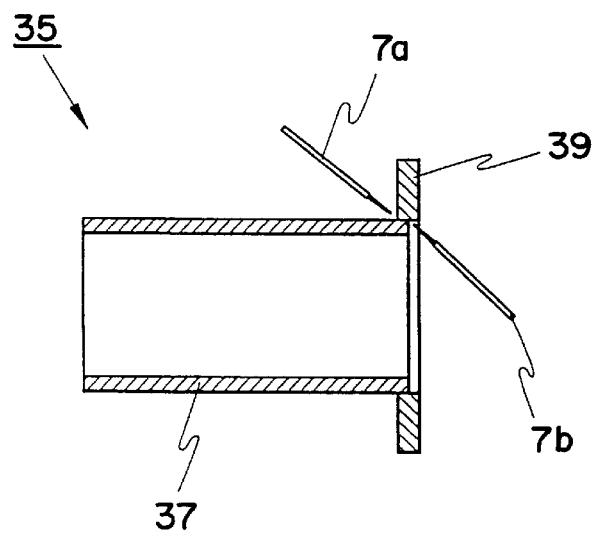
FIG. 4 is a sectional view of the welding object shown in FIG. 3.

FIG. 3 is a perspective view showing an example of a welding object, and FIG. 4 is a sectional view of the welding object shown in FIG. 3, which show an example of a welding object employed to illustrate the method for controlling the welding robot according to the present invention.

The welding object 35 consists of a cylindrical pipe 37, and a flange 39 to be welded on an end of the pipe 37. As shown in the figures, the pipe 37 and the flange 39 are coupled together by a tack welding before they are conveyed to the welding robot system 1. The welding object 35 has an outer welding portion formed by the outer circumference of the pipe 37 and the edge of the opening of the flange 39, and an inner welding portion formed by the inner circumference of the pipe 37 and the inner surface of the opening of the flange 39. These welding portions form welding lines which are circularly extended with respect to a central axis of the pipe 37.

Figure 5:
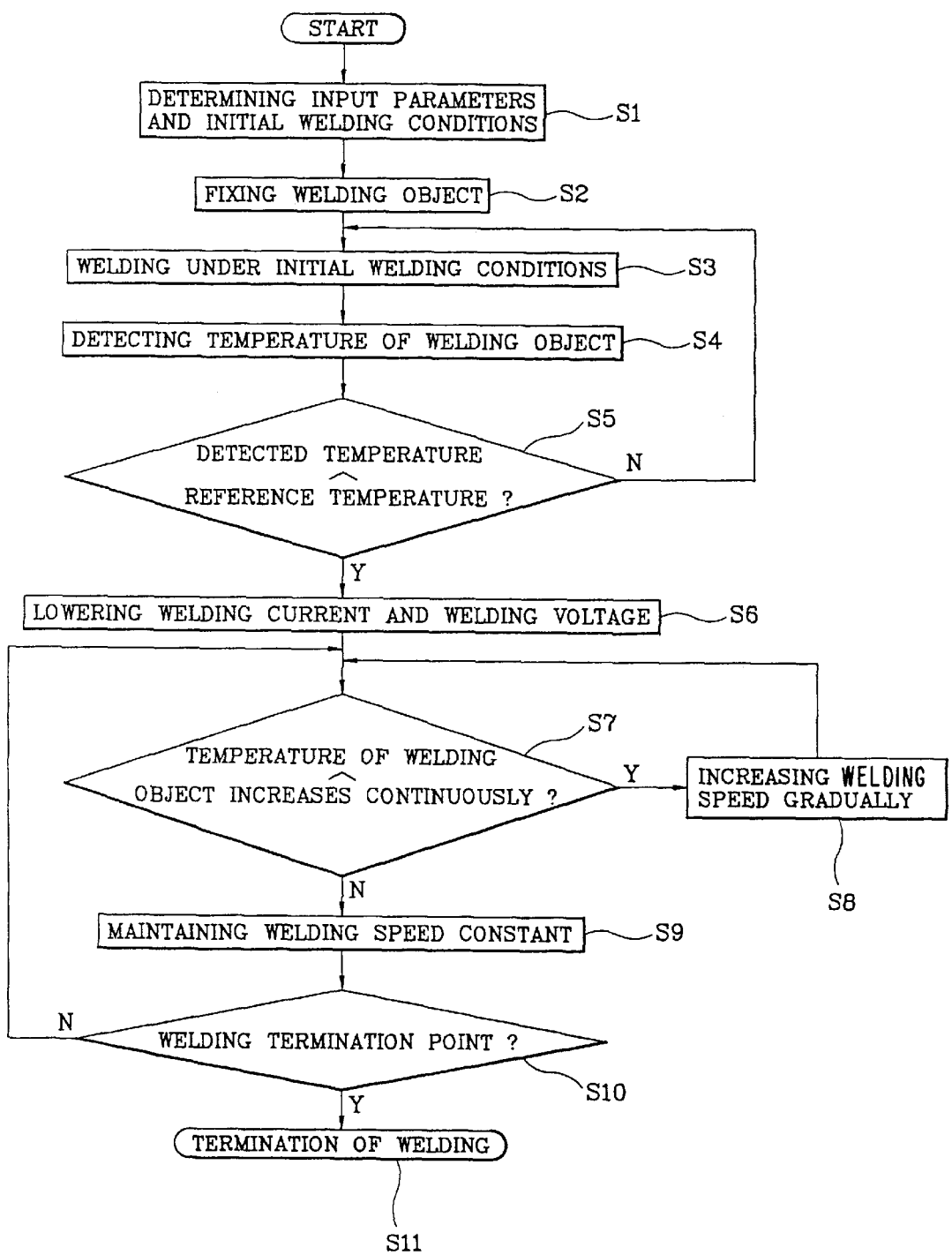
FIG. 5 is a flow chart for illustrating the process for welding the welding object shown in FIGS. 3 and 4.

FIG. 5 is a flow chart showing the process for welding the welding object 35 shown in FIGS. 3 and 4 according to a method for controlling the welding robot of the present invention. Before starting the welding operation, the control part 21 receives data for determining the welding conditions for the welding object 35, i. e., a variety of parameters such as the type of the welding object, the geometric data of the welding portion, the depth of penetration, the starting point of welding, and the termination point of welding. On the basis of the input parameters, the control part 21 determines initial welding conditions suitable for the welding object 35 (S1). Then the welding object 35 as shown in FIG. 4 is fixed to the welding jig 15 (S2). After the welding object 35 is fixed, the welding torches 7a and 7b of the welding robots 5a and 5b are moved, respectively so that respective front ends thereof are disposed near the corresponding welding portions with a predetermined gap between them as shown in FIG. 4.

Then, the welding operation is performed from a starting point of welding (S3) under the initial welding conditions determined in the step (S1). The welding operation is performed according to the control of the control part 21. That is, while the electrical power, the gas, and the wire 11 are supplied from the power supply part 31, the gas supply line 17 and the wire supply devices 9a and 9b respectively, the welding jig 15 rotates and the welding torches 7a and 7b perform weaving operation to perform the welding. For example, in the initial welding conditions, the electrical power supplied from the power supply part 31 is set to be 20V/140 A, and the welding object 35 on the welding jig 15 rotates at a predetermined constant rotational velocity.

While the welding operation proceeds, the temperature of the welding object 35 will rise due to welding heat transmitted from the welding portion, and the variation of the temperature is detected by the temperature sensor 19 (S4).

Then the control part 21 compares the signals from the temperature sensor 19 with a predetermined reference temperature (S5). If the temperature of the welding object 35 is lower than the reference temperature, the initial welding conditions are maintained. Meanwhile, if the temperature of the welding object 35 is higher than the reference temperature, the welding conditions are changed to compensate for a rise in the temperature rise of the welding object (S6). The change of the welding conditions is performed in such a manner that the welding voltage and the welding current are lowered gradually or stepwise in accordance with the temperature of the welding object 35. In the present embodiment, when the temperature of the welding object 35 exceeds the predetermined reference temperature, the welding voltage and current are lowered by one step. For example, the initial value, 20V/140 A, is lowered to 18V/125 A.

Figure 6:
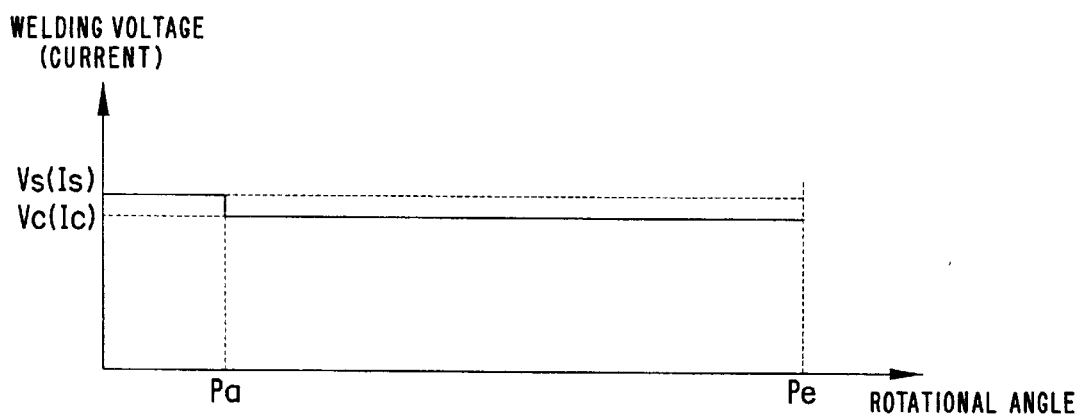
FIG. 6 is a graph showing the variation of the welding voltage and the welding current according to the rotational angle of the welding object.

FIG. 6 is a graph showing the variation of the welding voltage and the welding current according to the rotational angle of the welding object. As shown in the graph, the initial welding voltage Vs and current Is are lowered to the welding voltage Vc and current Ic at a rotational angular point of the welding object 35, i. e., at the condition change point Pa at which the temperature of the welding object 35 exceeds the predetermined reference temperature. The changed welding voltage Vc and current Ic are maintained up to the welding termination point Pe.

When the temperature of the welding object 35 exceeds the predetermined reference temperature, the voltage and current are lowered by one step, and at the same time, it is checked if the temperature of the welding object 35 rises continuously (S7). Particularly, the temperature of the cylindrical welding object 35 may rise continuously. In such a situation, the welding quality cannot be ensured by mere lowering the voltage and current, and therefore, the rotational velocity of the welding object 35 is increased in response to the temperature rise (S8). As the welding torches 7a and 7b approach the welding termination point Pe, that is, as the rotational angle of the welding object 35 reaches 360 degrees, the temperature of the welding object 35 doesn't rise any further and reaches an equilibrium state. In such a situation, the rotational velocity of the welding object is maintained constant (S9). When the welding torches 7a and 7b reach the welding termination point Pe (S10), the control part 21 terminates the welding operation (S11).

Figure 7:
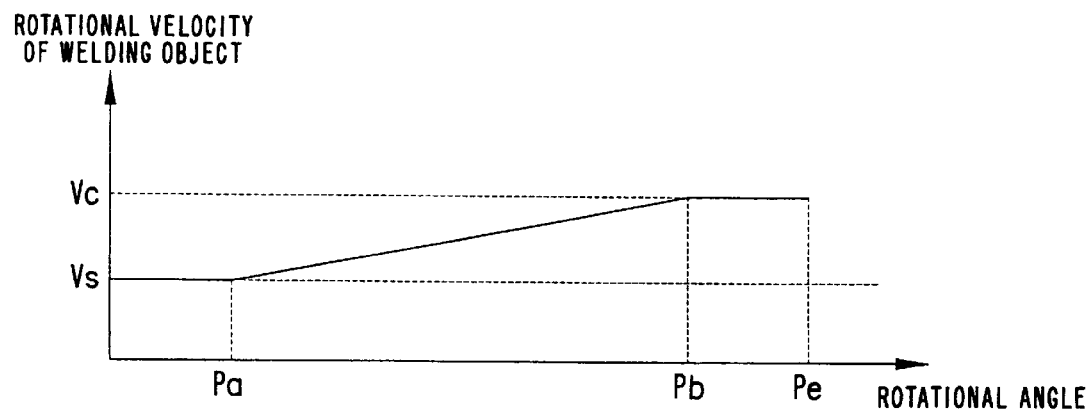
FIG. 7 is a graph showing the variation of the rotational velocity of the welding object according to the variation of the temperature of the welding portion.
Figure 8:
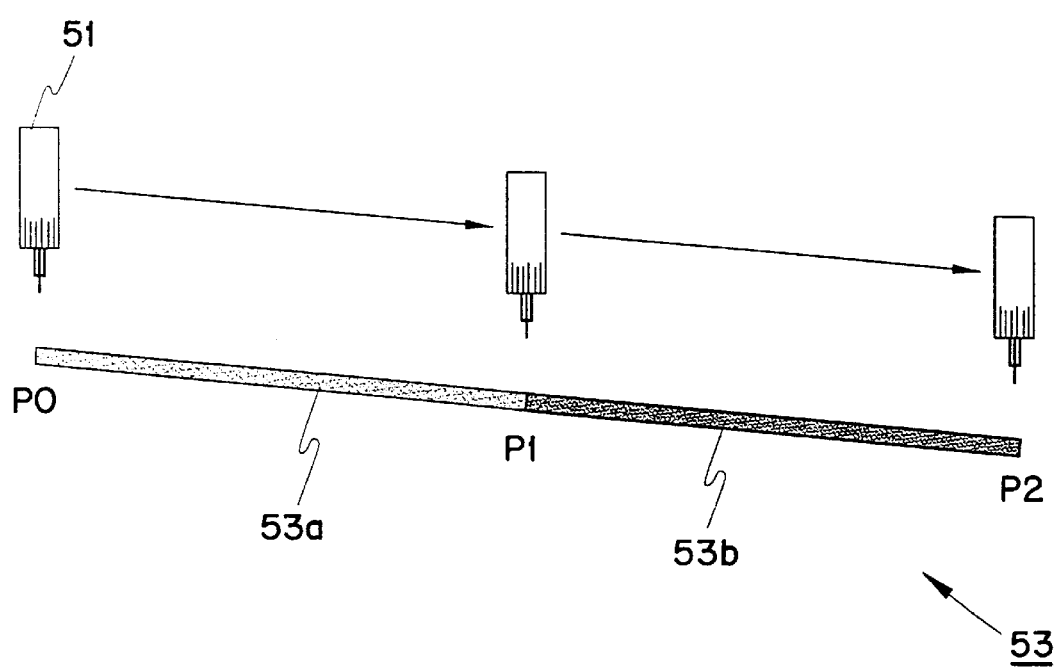
FIG. 8 is a view for illustrating an example of the change of the welding conditions in the conventional welding robot.

FIG. 7 is a graph showing the variation of the rotational velocity of the welding object 35. The rotational velocity of the welding object 35 is maintained constant up to the condition change point Pa, and thereafter, the rotational velocity increases linearly according to the gradual temperature rise. When the welding torches 7a and 7b approach the welding termination point Pe, the temperature of the welding object 35 reaches an equilibrium state, and doesn't rise any further. Accordingly, the rotational velocity of the welding object 35 is maintained constant from the equilibrium point Pb up to the welding termination point Pc.

In the embodiment described above, the welding conditions are changed in accordance with the temperature variation of the welding object 35. However, the welding conditions can also be changed according to data determined on the basis of an experimental result, or a condition change point and a condition change value inputted by an operator. The welding conditions to be changed can be one of the welding voltage, the welding current and the welding speed, or a plurality of them. Further, the change of the welding conditions may be made stepwise or gradually.

According to the present invention, while the welding is performed, the real-time change of the welding conditions such as the welding voltage, the welding current and welding speed can be made. Therefore, it is possible to do a continuous welding without stopping the operation of the welding robot. Accordingly, the discontinuity of the welding bead does not occur, the welding quality is improved, and an after-treatment for removing the discontinuous welding bead is not needed.

What is claimed is:

1. A method for welding a cylindrical object by controlling a welding robot having an object supporter for supporting the cylindrical welding object for rotation about a center axis of the object, and a welding torch for welding the object, the method comprising the steps of:

welding the object under predetermined initial welding conditions while rotating the object relative to the welding torch along a predetermined welding line;

determining a changing point as a basis for changing the initial welding conditions;

determining a changing value of the initial welding conditions at the changing point; and changing the initial welding conditions with the changing value at the changing point, while the welding continues;

wherein the initial welding conditions include a rotational speed of the welding object relative to the welding torch;

wherein the determination of the changing point is carried out by detecting when a temperature of a portion of the object being welded reaches a predetermined level; and wherein the rotational speed of the welding object is linearly increased beginning at a time when the detected temperature of the portion of the welding object reaches the changing point to a time when the detected temperature of the portion of the welding object reaches an equilibrium state.

2. A method for controlling a welding robot as claimed in claim 1, wherein the temperature of the welding object reaches the equilibrium state when a rotational angle of the welding object reaches approximately 360 degrees.

3. A method for controlling a welding robot as claimed in claim 2, wherein the rotational speed of the welding object becomes constant after the temperature of the welding object reaches the equilibrium state.

4. An apparatus for controlling a welding robot comprising:

an object supporter for supporting a cylindrical welding object to be welded for rotation about a center axis thereof;

a welding torch for welding the welding object under predetermined welding conditions during relative movement between the welding torch and the welding object along a predetermined welding line;

a temperature sensor for detecting a temperature of a portion of the welding object; and a control part for linearly increasing a rotational speed of the welding object from a time when a temperature detected by said temperature sensor reaches a predetermined changing point to a time when the detected temperature reaches an equilibrium state, while the welding continues.

5. An apparatus for controlling a welding robot as claimed in claim 4, wherein the control part controls the rotational speed of the welding object to become constant after the temperature of the welding object reaches the equilibrium state.

* * * * *